United States Patent [19]
Aoki

[11] Patent Number: 4,850,550
[45] Date of Patent: Jul. 25, 1989

[54] CLUTCH MECHANISM FOR USE IN DOUBLE BEARING REEL

[75] Inventor: Atsuhito Aoki, Hiroshima, Japan

[73] Assignee: Ryobi Ltd., Hiroshima, Japan

[21] Appl. No.: 129,281

[22] Filed: Dec. 7, 1987

[30] Foreign Application Priority Data

Dec. 8, 1986 [JP] Japan .............. 61-189488[U]

[51] Int. Cl.$^4$ .................. A01K 89/015; A01K 89/02
[52] U.S. Cl. .................................... 242/218; 242/219
[58] Field of Search ............ 242/211, 217, 218, 219, 242/220, 221, 212; 192/93 A, 89 A; 74/405

[56] References Cited

U.S. PATENT DOCUMENTS

| | | | |
|---|---|---|---|
| 1,939,148 | 7/1932 | Spenny | 242/220 |
| 4,014,422 | 3/1977 | Morishita | 242/212 X |
| 4,142,694 | 3/1979 | Rankin | 242/220 X |
| 4,341,366 | 7/1982 | Kawada | 242/220 |
| 4,369,936 | 1/1983 | Noda | 242/220 |
| 4,379,530 | 4/1983 | Kobayashi | 242/220 |
| 4,406,427 | 9/1983 | Murakami | 242/218 |
| 4,640,471 | 2/1987 | Murakami et al. | 242/221 X |
| 4,697,760 | 10/1987 | Aoki | 242/220 |
| 4,708,303 | 11/1987 | Emura et al. | 242/219 X |
| 4,709,874 | 12/1987 | Murakami | 242/220 |
| 4,768,735 | 9/1988 | Aoki | 242/220 |

FOREIGN PATENT DOCUMENTS

| | | | |
|---|---|---|---|
| 60-55370 | 4/1985 | Japan | 242/220 |
| 78526 | 5/1985 | Japan | 242/220 |

Primary Examiner—Joseph J. Hail, III
Attorney, Agent, or Firm—Finnegan, Henderson, Farabow, Garrett & Dunner

[57] ABSTRACT

A clutch mechanism for use in a double bearing reel includes a pivoted push lever mechanism for rotating a clutch cam to move a clutch bar to slide a pinion into and out of engagement with a spool shaft to transmit or prevent the transmission, respectively, of rotational force from a handle to the spool shaft.

4 Claims, 4 Drawing Sheets

CLUTCH MECHANISM FOR USE IN DOUBLE BEARING REEL

FIELD OF THE INVENTION

The present invention generally relates to clutch mechanisms in double bearing reels for fishing and particularly relates to a clutch mechansim for a double bearing fishing reel in which the transmission of rotational force may be turned on and off between a spool on which a fishing-line is wound and a handle for rotating the spool in the wind-up direction, and in which the state of rotational force transmission can be automatically changed from the off state to the on state by the rotation of the handle in the wind-up direction.

BACKGROUND OF THE INVENTION

Conventionally, in a clutch mechanism as disclosed in Japanese Unexamined Patent Publication No. 60-55370, a pinion is engaged with a driving gear rotated by a handle and attached to a spool shaft slidably in the axial direction of the spool shaft so as to be engaged/disengaged with/from the spool shaft. A clutch bar is engaged with the pinion to enable the pinion to slide in the axial direction. A rotatable clutch cam is provided concentric with the spool shaft between the clutch bar and a side plate of a reel body, and an operation member rotates the clutch cam in the clutch releasing direction. The clutch cam is rotated by the operation member to release the connection between the pinion and the spool shaft. A ratchet is rotated by the rotation of the handle in the wind-up direction to rotate the clutch cam in the reverse direction to make the connection between the pinion and the spool shaft.

In the clutch mechanism in the fishing reel disclosed in the above Unexamined Patent Publication, clutch connecting means and clutch releasing means are arranged as follows. As shown in FIG. 11, the clutch connecting means is arranged so that a cam member (a clutch cam) is rotated in the clutch connecting direction by a ratchet wheel a that rotates while a handle (not shown) is rotated in the wind-up direction of the fishing-line. The clutch releasing means is provided with a hook-shaped lever c pivotally supported by a pin f provided between a pair of opposing reel side-plates d for rotating the cam member b in the direction releasing the clutch. A clutch release lever e is rotatably supported by a pin f' transversly provided between the reel side-plate d and a base plate h. The clutch release lever e is provided with a finger operation portion e' extending backward, a connection portion e" extending downward, and a connection pin q provided on a tip end of the connection portion e". The connection pin q is passed through elongated holes i formed in the reel side-plate d and the base plate h to engage with an end c' of the hook-shaped lever c. The other end c" of the hook-shaped lever c is connected to a connection portion b' of the cam member b through a pin j.

In such an arrangement, however, there have been problems in that it sometimes becomes impossible to perform the clutch releasing operation because a stopper portion b" of the cam member b abuts against a tooth portion of the ratchet wheel a in releasing the clutch. It is necessary to form the elongated hole i in the side plate d and the base plate h as described above, and water, dust, or the like may easily enter through the elongated hole i into the clutch mechanism portion, bearing portions, etc., to make it difficult sometimes to carry out the clutch releasing operation and connection change-over operation. Consequently, the "click feeling" associated with the connection changing operation may disappear.

SUMMARY OF THE INVENTION

It is therefore an object of the present invention to solve the problems in the device described above.

It is another object of the present invention to provide a clutch mechanism in which a kick claw having first, second, and third claw portions is provided for rotation and upward/downward movement between a ratchet and a clutch cam so that the clutch releasing and the clutch connecting operations by the ratchet can be carried out smoothly.

In order to attain the above and other objects according to the present invention, a clutch mechanism for a double bearing reel comprises a spool shaft rotatably pivoted between side plates opposed to each other, a pinion attached to the spool shaft, slidable in the axial direction of the spool shaft and arranged to be engaged/disengaged with/from the spool shaft, a clutch bar slideable in the direction of the pinion to engage/disengage the pinion with/from the spool shaft, a rotatable clutch cam concentric with the spool shaft to displace the clutch bar to engage/disengage the pinion with/from the spool shaft, a handle for transmitting rotational force to the pinion to rotate a spool fixed on the spool shaft in the wind-up direction of the fishing line, a ratchet for preventing the handle from rotating in a direction opposite to the wind-up direction of the fishing line, a kick claw provided on the side plate and arranged to be rotatable and upward/downward movable between the clutch cam and the ratchet, the kick claw being provided with a first claw portion having at an upper portion a spring hooking portion for hooking a side portion of a kick spring engaged with the ratchet to rotate the clutch cam in a direction to move the clutch mechanism into a clutch-connected state from a released state of the clutch mechanism, a second claw portion for urging the clutch cam when the clutch mechanism is in the clutch-connected state, and a third claw portion arranged to be urged by the clutch cam to maintain the first claw portion in a state released from the ratchet when the clutch mechanism is brought into the clutch-connected state, the first claw portion being urged by the kick spring so that the first claw portion is engaged with the ratchet, a push lever pivoted by a push lever shaft to be upward/downward movable between the side plates at a rear portion of the reel body, a first interlocking lever having one end fixed to the push lever shaft fixed to the push lever, and a second interlocking lever rotatably pivoted on one of the side plates and arranged to operate the clutch cam to rotate in a selected one of the directions to turn the clutch mechanism off and on in accordance with the forward /reverse rotation of the second interlocking lever, the first and second interlocking levers being pivotal relatively to each other and arranged to be operated to rotate by the push lever.

BRIEF DESCRIPTION OF THE DRAWINGS

Other features and advantages of the present invention will be apparent from the following description taken in connection with the accompanying drawings wherein.

DETAILED DESCRIPTION OF THE PREFERRED EMBODIMENTS

Figure 1:
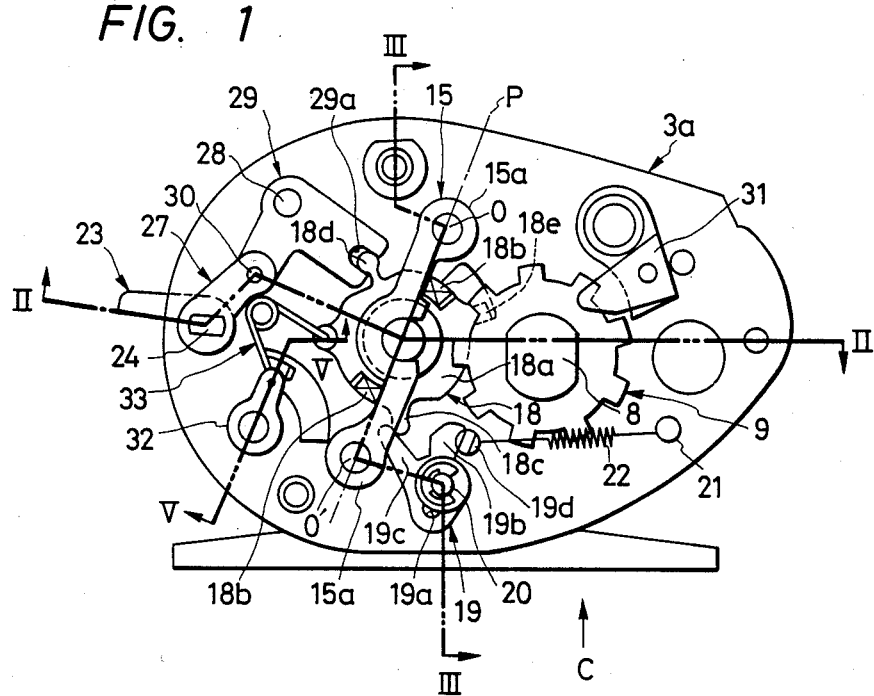
FIG. 1 is a front view showing an embodiment of a clutch mechanism for a double bearing reel according to the present invention in the connected state of the clutch.
Figure 2:
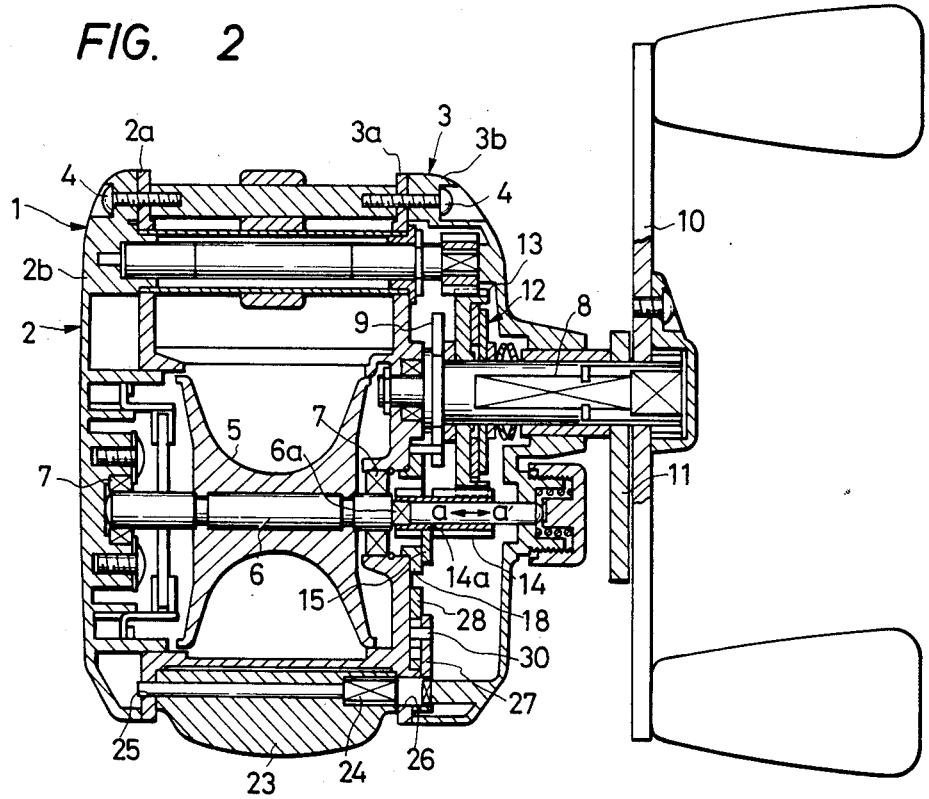
FIGS. 2 is a cross section viewed in the direction of arrows II—II in FIG. 1.
Figure 3:
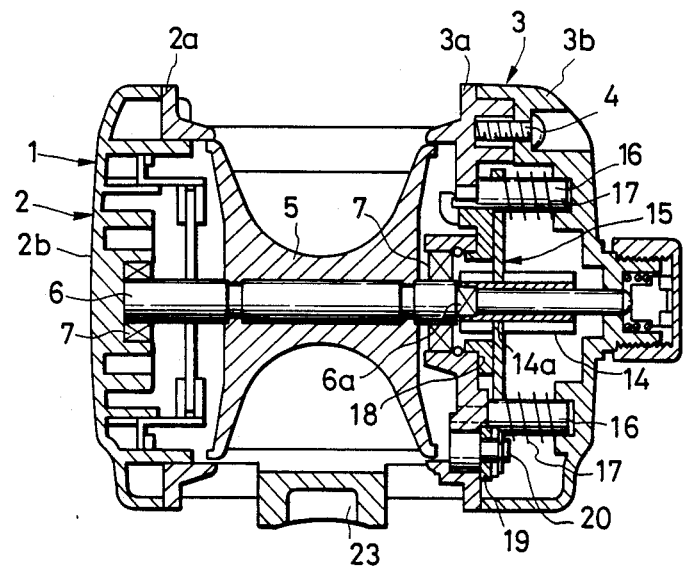
FIG. 3 is a cross section viewed in the direction of arrows III—III in FIG. 1.

As shown FIGS. 1 through 4, a reel body 1 is arranged so that left and right side frames 2 and 3 are disposed in opposition to each other with a predetermined space therebetween to form a frame assembly. The side frames 2 and 3 are respectively constituted by side plates 2a and 3a and cover plates 2b and 3b fixed to the respective outsides of the side plates 2a and 3a by screws 4 so as to define respective hollow portions.

A spool shaft 6 having a spool 5 fixed thereon is rotatably provided between the side plates 2a and 3a through bearings 7 and an end of the spool shaft 6 extends into the side frame 3. A handle shaft 8 is rotatably supported by the side plate 3a and the cover plate 3b. A ratchet 9 and a handle 10 are fixed to the handle shaft 8, and a drag handle 11 is screwed into the handle shaft 8 so that the drag handle can be rotated to move axially along the handle shaft 8. A driving gear 13 is provided between the drag handle 11 and the ratchet 9 through a drag mechanism 12.

A segmental portion 6a is formed on the spool shaft 6 and an oval hole (not shown), or the like, to be fitted with the segmental portion 6a is formed on a pinion 14, so that the pinion 14 is slidably mounted on the spool shaft 6. The pinion 14 can be engaged with and disengaged from the spool shaft by sliding the pinion 14 in the direction of arrows a—a' in FIG. 2.

The pinion 14 is engaged with the driving gear 13 to transmit rotary force of the handle 10 to the spool shaft 6. A clutch bar 15 is fittingly engaged with an annular recess portion 14a formed in the outer circumference of the pinion 14. Arms 15a project symmetrically outward in opposition to each other from the clutch bar 15 and are fittingly inserted into guide pins 16 planted in the side plate 3a so that the clutch bar 15 is arranged to be slidable in the sliding direction of the pinion 14 and to be elastically urged toward the side plate 3a by springs 17 externally provided on the guide pins 16. In this manner, the pinion 14 is coupled with the spool shaft 6.

Slide fulcrums 0 an 0' of the arms 15a and 15b of the clutch bar 15 are on a straight line P passing through the center of the pinion 14. A rotatable clutch cam 18 is provided between the side plate 3a and the clutch bar 15 concentric with the spool shaft 6, and a positioning protrusion 18e is provided on the clutch cam 18 to engage with a positioning elongated hole 34 to perform rotation-positioning of the clutch cam 18.

Figure 7:
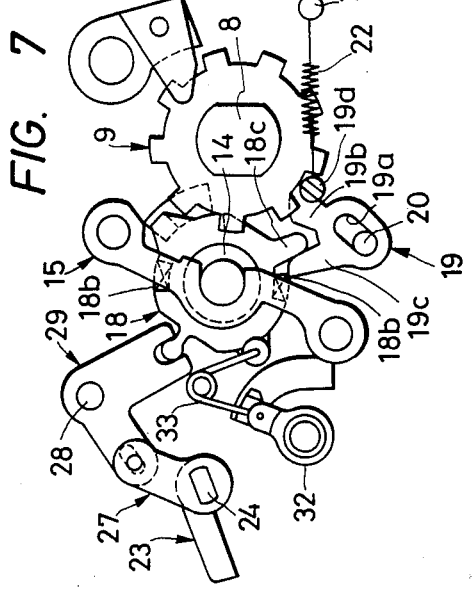
FIGS. 6 through 10 are operational diagrams for explaining the clutch releasing operation and the clutch connecting and change operation of the clutch mechanism of the present invention.

Two cam portions 18b are provided on an annular portion 18a of the clutch cam 18 to correspond to the arms 15a of the clutch bar 15. The cam portions 18b are slantingly projected therefrom and each has a substantially larger axial displacement quantity than the axial engagement length of the pinion 14 with the segmental portion 6a of the spool shaft 6. Thus, when the clutch cam 18 is rotated counterclockwise in FIG. 1, the arms 15a of the clutch bar 15 ride on the cam portions 18b to move the clutch bar 15 in the direction shown by the arrow a' in FIG. 2 by an amount corresponding to the projecting lengths of the cam portions 18b so that the pinion 14 is moved in the direction of the arrow a' to be disengaged from the spool shaft 6. Accordingly, the handle 10 no longer transmits the force to the spool shaft 6 so that the clutch is brought into the released state as shown in FIG. 7.

A kick claw 19 is provided at a lower position between the ratchet 9 and the clutch cam 18, and is pivotally supported to be rotatable and to be upward/downward movable by a kick claw shaft 20 projecting from the side plate 3a toward the side frame 3 and fittingly inserted into an elongated hole 19a formed in the kick claw 19.

The kick claw 19 is substantially V-shaped and is provided with a first claw portion 19d, a second claw portion 19c, and a third claw portion 19b. The first claw portion 19d has at its upper portion a spring hooking portion for hooking one end of a kick spring 22 and is arranged to be removably engageable with the ratchet 9. The second claw portion 19c is arranged to urge a projecting portion 18c of the clutch cam 18 in the clutch connecting direction (counterclockwise in FIG. 7), the projecting portion 18c is provided on the clutch cam 18 so as to project in the radial direction of the same. The third claw portion 19b is arranged to maintain the first claw portion 19d at a position where the first claw portion 19d is not in contact with the ratchet 9 while the clutch is in its released state.

The kick claw spring 22 is hooked at its opposite ends by the spring hook provided at the upper portion of the first claw portion 19d and a spring hook 21 provided on the side plate 3a so as to be stretched between the first claw portion 19d and the side plate 3. The kick claw 19 is elastically urged by kick claw spring 22 in the direction so that the first claw portion 19d engages the ratchet 9.

A push lever 23 for releasing the clutch is upward/downward rotatably pivoted by a push lever shaft 24 between the side plates 2a and 3a at the rear position of the reel body 1. An oval hole, or the like, is formed in the push lever shaft 24 and a segmental portion of the push lever 23 is inserted into the oval hole to fix the push lever 23 to the push lever shaft 24. The opposite end portions of the push lever shaft 24 are fitted into shaft holes 25 and 26 formed in the side plates 2a and 3a, respectively.

The push lever shaft 24 is extended from the side plate 3a into the side frame 3 and an end of a first interlocking lever 27 is fixed to an extension end of the push lever shaft 24. A second interlocking lever 29 is rotatably pivoted by a boss 28 projecting from the side plate 3a.

A groove 29a is formed in an end of the second interlocking lever 29 extending toward the clutch cam 18, and an engaging protrusion 18d of the clutch cam 18 is provided to extend in the radial direction. The engaging protrusion 18d and the groove 29a are slidably engaged with each other so that the clutch cam 18 can be rotated by the second interlocking lever 29.

The other end of the second interlocking lever 29 extending toward the first interlocking lever 27 and the other end of the first interlocking lever 27 are pivoted relative to each other by a pin 30, so that when the push lever 23 is rotated downward from the position shown in FIG. 1, the clutch cam 18 is rotated counterclockwise in FIG. 1, that is, in the clutch releasing direction through the first and second interlocking levers 27 and 29.

A reversing prevention claw 31 is engaged with the ratchet 9 so that the handle 10 is made to be rotatable only in the forward or wind-up direction of the fishing line and cannot rotate in the reverse direction.

Figure 5:
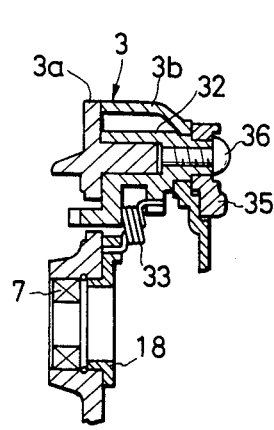
FIG. 5 is a diagram viewed in the direction of arrows V—V in FIG. 1.
Figure 4:
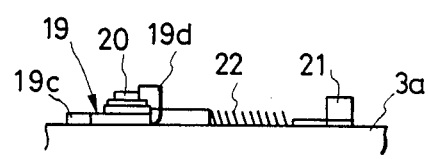
FIG. 4 is a diagram viewed in the direction of an arrow c in FIG. 1.

In FIGS. 1 and 5, a flipping cam 32 is pivotally supported on the side plate 3a, and a dead point spring 33 is hooked at its ends by the extended end of the flipping cam 33 and the clutch cam 18 can be maintained at the clutch-connected position in FIG. 1 or at the clutch-released position in FIG. 7. In FIG. 5, the reference numerals 35 and 36 designate a flipping lever and a set-screw, respectively.

Referring to FIGS. 1 and 6 through 10, the operation of the clutch mechanism having the above arrangement will be described hereunder.

In the connected state of the clutch in FIG. 1, if the push lever 23 is rotated downward, the first interlocking lever 27 is rotated counterclockwise through the push lever shaft 24, the second interlocking lever 29 is rotated clockwise about the boss 28, and the clutch cam 18 is rotated counterclockwise. Accordingly, a clutch bar 15 is moved with the pinion 14 by the cam portions 18b in the direction so that the clutch bar 15 is disengaged from the spool shaft 6 to establish the released state of the clutch as shown in FIG. 7.

Figure 6:
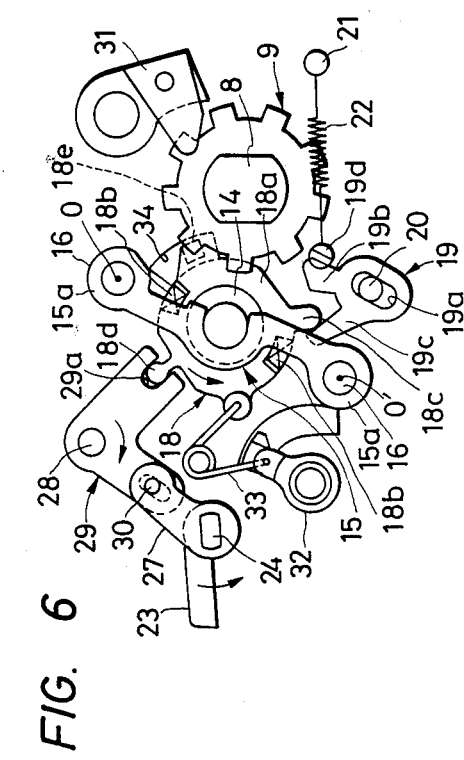

At that time, the protrusion 18c of the clutch cam 18 which has urged the third claw portion 19c of the kick claw 19 counterclockwise in FIG. 1 is also rotated in the same direction as the clutch cam 18, so that the kick claw 19 is rotated clockwise about the kick claw shaft 20 by the tension of the kick spring 22 while moving upward as shown in FIGS. 6 and 7. Thus, the first claw portion 19d engages the ratchet 9.

Even if the first claw portion 19d abuts against the protrusion of the ratchet 9 and fails to engage the recess portion of the ratchet 9, the kick claw 19 does not affect the rotation of the clutch cam 18 so that the clutch releasing operation is smoothly carried out.

Figure 9:
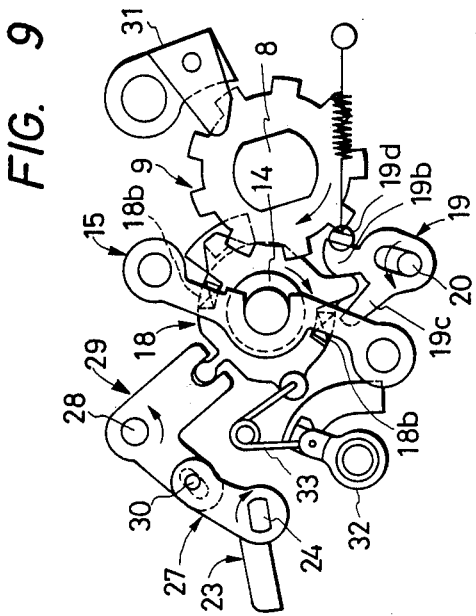
Figure 8:
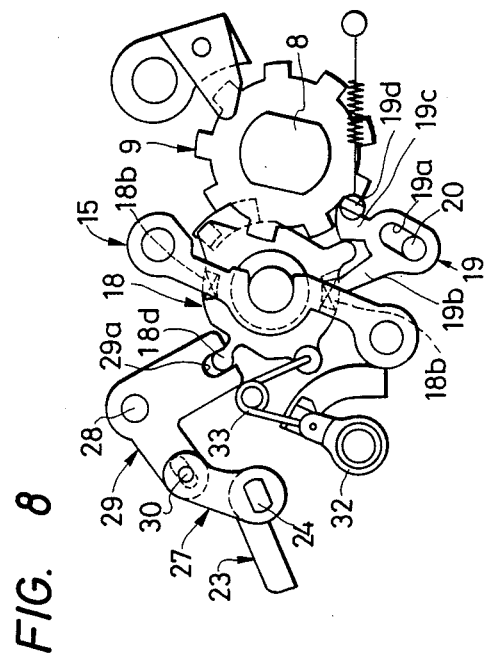
Figure 10:
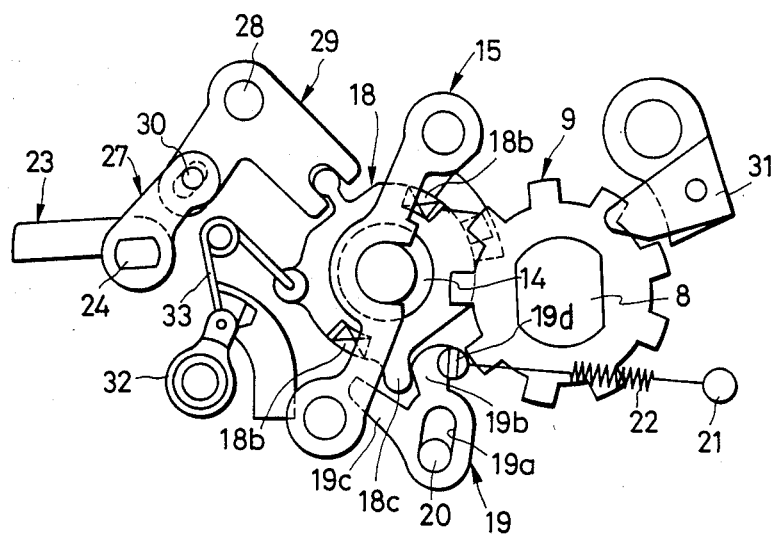
Figure 11:
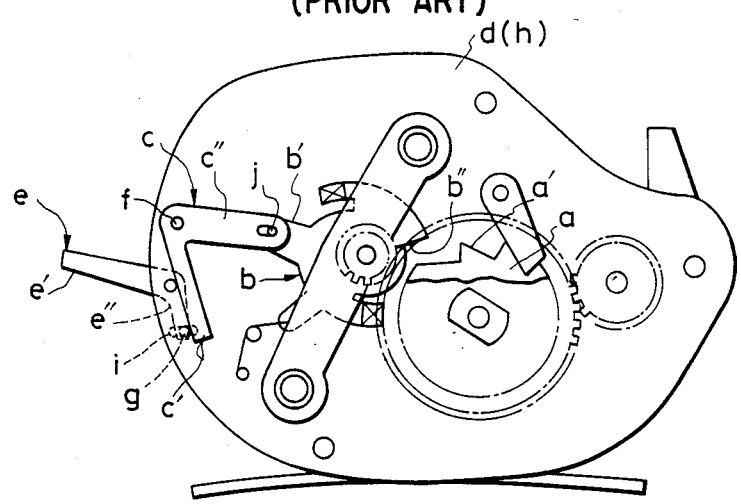
FIG. 11 is a front view showing an example of a conventional double bearing reel clutch mechanism.

In the released state of the clutch in FIG. 7, if the handle 10 is rotated in the wind-up direction of the fishing line so that the ratchet 9 is rotated in the same direction as the handle 10, the first claw portion 19d is urged by the protrusion portion of the ratchet 9 so that the kick claw 19 is rotated counterclockwise against the tension of the kick claw spring 22. Accordingly, the protrusion 18c of the clutch cam 18 is urged by the second claw portion 19b as shown in FIG. 8 and the clutch cam 18 is rotated clockwise sucessively passing the states in order as shown in FIGS. 9 and 10 to reach a predetermined position so that the clutch bar 15 is released from the urging force by the cam position 18b and slid by the elastic force of the springs 17 together with the pinion 14 on the spool shaft 6 in the direction of arrow a in FIG. 2 to engage with the spool shaft 6. Accordingly, the released state of the clutch is changed into the connected state shown in FIG. 1. At that time, the push lever 23 is returned to the original position through the second and first interlocking levers 29 and 27.

The clutch cam 18 is maintained by the dead point spring 33 of the flipping cam 32 either at the released position of the clutch or at the connected position of the clutch.

As described above, in the double bearing clutch mechanism in which the released state of the clutch can be obtained in a manner so that the rotatable clutch cam 18 provided concentric with the spool shaft 6 is rotated, the clutch bar 15 is moved in the axial direction of the spool shaft 6, and the pinion 14 is slid in the direction to disengage the pinion 14 from the spool shaft 6 to put the clutch mechanism into the released state. The connected state of the clutch can be obtained in a manner so that in the above-mentioned released state the ratchet 9 is rotated by the rotation of the handle 10 in the wind-up direction of the fishing line, and the clutch cam 18 is rotated in the reverse direction operation to return the clutch mechanism to the connected state. The improvement is made according to the present invention in a manner so that the rotatable push lever 23 for releasing the clutch is pivotally supported by the push lever shaft 24 at a position between the side plates 2a opposed to each other at the rear portion of the reel body 1. The first interlocking lever 27 is fixed at its end to the push lever shaft 24. The second interlocking lever 29 is rotatably pivoted on the side plate 3a to rotate the clutch cam 18. The first and second interlocking levers 27 and 29 are pivoted to each other, and the clutch cam 18 is rotatable in the clutch releasing direction through the first and second interlocking levers 27 and 29 when the push lever 23 is rotated downward. The rotatable kick claw 19, having elongated opening 19a, is upward/downward movably provided on kick claw shaft 20 between the clutch cam 18 and the ratchet 9, and the kick claw 19 is elastically urged by the kick spring 22 to engage the ratchet 9 with the first claw portion 19d. Accordingly, it is not necessary to form an elongated hole for moving the push lever 23 in the side plate 3a, and it suffices to form only a shaft hole in the side plate 3a so that the push lever shaft 24 can be rotatably fitted in the shaft hole. Thus, it is possible to solve the problem that water, dust, and the like enter the clutch mechanism portion through an elongated hole like in the prior art clutch mechanism. The push lever 23 only rotates and does not slide between the opposite side plates unlike the prior art clutch mechanism, so that frictional resistance becomes small and it is unlikely that dust, etc. will enter between the side plate 3a and the push lever 23. Further, in the clutch releasing operation, the clutch cam 18 does not abut against the protrusion portion of the ratchet 9, so that the clutch releasing/connecting operation can be carried out smoothly with a clicking feeling.

What is claimed is:

1. A clutch mechanism for a double bearing fishing reel comprising:
   a pair of opposed side plates;
   a spool shaft rotatably pivoted between said side plates;
   a pinion having an elongated axis and disposed to engage said spool shaft, a clutch means for selectively engaging and disengaging said pinion from said spool shaft;
   said clutch means including a clutch bar provided movably in the axial direction of said pinion to engage said pinion with and disengage said pinion from said spool shaft;

said clutch means further including a clutch cam provided rotatably and concentrically with said spool shaft, having a first protrusion and a second protrusion, and being disposed to slide said clutch bar to cause said pinion and said spool shaft to be engaged and disengaged from each other;

a handle for transmitting rotational force to said pinion to rotate said spool shaft in a first direction;

a ratchet for preventing said handle from rotating said spool shaft in a direction other than said first direction;

a rotatable push lever means pivotally provided between said side plates;

a first interlocking lever having a first end fixed to said push lever means and a second end;

a second interlocking lever rotatably pivoted on one of said side plates and having a first end arranged to engage said second end of said first interlocking member, and a second end arranged to engage said first protrusion of said clutch cam; and a U-shaped kick claw having an open end and an opposed closed end, and including a first claw portion, a second claw portion and a third claw portion, said open end for receiving said second protrusion of said cam member, said first claw portion for engaging said ratchet, said second claw portion for engaging said second protrusion of said cam member to rotate said cam member in a clockwise direction in response to the rotation of said ratchet in a clockwise direction, said third claw portion for engaging said second protrusion of said cam member to prevent said first claw portion from engaging said ratchet when said pinion is engaged with said spool shaft, and a kick claw spring attached to said kick claw for urging said first claw portion to engage said ratchet.

2. A clutch mechanism according to claim 1, wherein said rotatable push lever means comprises:
rotatable push lever shaft; and
a push lever fixed to said push lever shaft for rotation therewith.

3. A clutch mechanism according to claim 1, further comprising a kick claw shaft mounted on one of said side plates, said kick claw being rotatably and slidably mounted on said shaft and disposed to move between said clutch cam and said ratchet.

4. A clutch mechanism as set forth in claim 1, further comprising a flipping cam pivotally mounted on one of said side plates and a dead point spring having first and second ends, said dead point spring being attached at said first end to said clutch cam and at said second end to said flipping cam, said dead point spring being disposed to hold the clutch mechanism in either a pinion engaged or pinion disengaged position.

* * * * *